United States Patent [19]
Shacklette et al.

[11] Patent Number: 5,281,363
[45] Date of Patent: Jan. 25, 1994

[54] POLYANILINE COMPOSITIONS HAVING A SURFACE/CORE DOPANT ARRANGEMENT

[75] Inventors: Lawrence W. Shacklette, Madison; Granville G. Miller, Morristown; Ronald L. Eisenbaumer, Morris Township, Morris County; Chien-Chung Han, Madison, all of N.J.; Bernhard M. WeBling, Bargteheide; Bernhard Wessling, Ahrensburg, both of Fed. Rep. of Germany

[73] Assignee: Allied-Signal Inc., Morristown, N.J.

[21] Appl. No.: 689,382

[22] Filed: Apr. 22, 1991

[51] Int. Cl.⁵ .............................................. H01B 1/00
[52] U.S. Cl. .................................. 252/500; 528/422; 528/487; 428/402; 428/407
[58] Field of Search ................ 252/500; 528/422, 487; 428/407, 402

[56] References Cited

U.S. PATENT DOCUMENTS

| | | | |
|---|---|---|---|
| 3,963,498 | 6/1976 | Trevoy | 252/500 |
| 4,025,463 | 5/1977 | Trevoy | 252/500 |
| 4,615,829 | 10/1986 | Tamura et al. | 252/500 |
| 4,762,644 | 8/1988 | Kobayashi et al. | 252/500 |
| 4,798,685 | 1/1989 | Yaniger | 252/500 |
| 4,806,271 | 2/1989 | Yaniger et al. | 252/500 |
| 4,822,638 | 4/1989 | Yaniger | 252/500 |
| 4,851,487 | 7/1989 | Yaniger et al. | 252/500 |
| 4,855,361 | 8/1989 | Yaniger et al. | 252/500 |
| 4,983,322 | 1/1991 | Eisenbaumer | 252/500 |
| 4,983,690 | 1/1991 | Cameron et al. | 252/500 |
| 5,002,700 | 3/1991 | Otagawa et al. | 252/500 |
| 5,008,041 | 4/1991 | Cameron et al. | 528/422 |

FOREIGN PATENT DOCUMENTS

| | | |
|---|---|---|
| 0035713 | 2/1981 | European Pat. Off. . |
| 0152632 | 12/1984 | European Pat. Off. . |
| 0259813 | 9/1987 | European Pat. Off. . |
| 62-12073 | 1/1987 | Japan . |
| 62-47109 | 2/1987 | Japan . |
| WO8901694 | 2/1989 | PCT Int'l Appl. . |
| WO9010297 | 9/1990 | PCT Int'l Appl. . |

OTHER PUBLICATIONS

T. Masatake et al; "Secondary batteries with polyaniline cathodes"; Aug. 8, 1988; Chemical Abstracts, vol. 109, No. 6, & Jpn. Kokai Tokkyo Koho JP 63 55,861(88 55,861) Mar. 10, 1988.
Chan et al., Thermal Analysis of Conducting Polymers Part I, Journal of Thermal Analysis, 35, 765–774 (1989).
Jen et al., Intl' Appl. #PCT/US88/02319.
S. Li et al. "Soluble Polyaniline" Synthetic Metals, 20 (1987) 141–149.
K. Hyodo et al. "Short Communication . . . High Ion Selective Electro chemical . . . " Electro Acia vol. 33, No. 1, pp. 165–166, 1983.
L. T. Yu et al. "Conductivite et Constitution Chimique pe Semi Conducteurs Macromoleculaires" Revue Generale de L'Elec. . . vol. 75 No. 9/pp. 1014–1019.
M. Jozefowicz et al. "Relations entre Proprietes Chimiques et . . . " Revue Generale de L'Electicite vol. 75, No. 9, pp. 1008–1013.
D. Muller et al. "Preparation, Proprietes Chimiques et Conduct . . . " pp. 4087–4091.
L. T. Yu et al. "Etude experimentale de la Conductivite en Couran Continu des Composes Macromoleculaires" Jrnl Polymer Sc. Pt C No. 16/pp. 2931–2942.
M. Jozefowicz et al. "Proprietes Nouvelles des Polymeres Semi . . . " J. Poly. Sci. Part C/No. 22, pp 1187–1195 (1969).

(List continued on next page.)

Primary Examiner—Karl Group
Assistant Examiner—Anthony J. Green
Attorney, Agent, or Firm—R. C. Stewart, II; G. H. Fuchs; D. L. Webster

[57] ABSTRACT

A electrically conductive polyaniline particle comprising a substituted or unsubstituted polyaniline doped with two or more dopants, at least one of said dopants predominating at or near the surface of said particles and at least one other dopant predominating at or near the core of said particle.

32 Claims, 3 Drawing Sheets

OTHER PUBLICATIONS

T. Kobayashi et al. "Electrochemical Reactions Concerned with Electrochromism . . ." J. Electroanal Chem. 177/(1984 pp. 281–291.

T. Kobayashi et al. "Oxidative Degradation Pathway of Polyaniline Film Electrodes" J. Electroanal Chem. 177 (1984) pp. 293–297.

F. Cristofini et al. "Proprietes Electrochimiques des Sulfates de Polyaniline" C.R. Acad. Sc. Paris, t. 268 (14 Apr. 1969) pp. 1346–1349.

D. Labarre et al. "Polymeres Conducteurs Organiques Filmogenes a base de Polyaniline" C.R. Acad. Sc. paris, t. 269 (29 Oct. 1969) pp. 964–969 Series C.

M. Doriomedoff et al. "Conductivite en Courant Continu Des Sulfates De Polyanilines" (#142) pp. 1055–1069.

L-T Yu et al. "Conductivite en Courant Continu des Materiaux Macromoleculaires" pp. 470–532 (Chapter 11).

R. de Surville et al. "Produits Oligomeres et Polymeres D'Oxydation des Amines Aromatiques" Ann. Chim. t2, 1967, pp. 5–13.

R. de Surville, "Electrochemical Chains Using Protolytic Organic Semiconductors" Elec. Acta 1958 vol. 13, pp. 1451–1458.

R. de Surville, "Produits D'oxidation Pousée des Amines Aromatiques" Ann. Chim. t2, 1967, pp. 149–157.

POLYANILINE COMPOSITIONS HAVING A SURFACE/CORE DOPANT ARRANGEMENT

BACKGROUND OF THE INVENTION

1. Field of the invention

This invention relates to novel electrically conductive polyaniline compositions. Another aspect of this invention relates to polyaniline articles, including films, fibers, coatings and the like formed from the polymer compositions of this invention.

2. Description of the Prior Art

There has recently been an increased interest in the electrochemistry and electrical phenomena of polymeric systems. Recently, work has intensified with backbone polymers having extended conjugation in at least one backbone chain.

One conjugated polymer system currently under study is polyaniline. Kobayashi, et al., *J. Electroanal. Chem.*, "Electrochemical Reactions Concerned with Electrochromism of Polyaniline Film-Coated Electrodes", 177 281–291 (1984), describes various experiments in which spectro electro-chemical measurement of a polyaniline film coated electrode were made. French Patent No. 1,519,729; French Patent of Addition 94,536; U.K. Patent 1,216,549; "Direct Current Conductivity of Polyaniline Sulfate", M. Doriomedoff, F. Kautiere - Cristofini, R. De Surville, M. Jozefowicz, L-T. Yu, and R. Buvet, *J. Chim. Phys, Physicochim. Biol,* 68, 1055 (1971); "Continuous Current Conductivity of Macromolecular Materials", L-T. Yu, M. Jozefowicz, and R. Buvet, *Chim. Macromol,* 1, 469 (1970); "Polyaniline Based Filmogenic Organic-Conductor Polymers", D. LaBarre and M. Jozefowicz, *C. R. Acad. Sci., Ser. C,* 269, 964 (1969); "Recently discovered properties of Semiconducting Polymers", M. Jozefowicz, L-T. Yu, J. Perichon, and R. Buvet, *J. Polym. Sci., Part C,* 22, 1187 (1969); "Electrochemical Properties of Polyaniline Sulfates", F. Cristofini, R. De Surville, and M. Jozefowicz, *C. R. Acad. Sci., Ser. C,* 268, 1346 (1979); "Electrochemical Cells Using Protolytic Organic Semiconductors", R. De Surville, M. Jozefowicz, L-T. Yu, J. Perichon, R. Buvet, *Electrochem. Acta.,* 13, 1451 (1968); "Oligomers and Polymers Produced by Oxidation of Aromatic Amines", R. De Surville, M. Jozefowicz, and R. Buvet, *Ann. Chem.* (Paris) 2 5 (1967); "Experimental Study of the Direct Current Conductivity of Macromolecular Compounds", L-T. Yu, M. Borredon, M. Jozefowicz, G. Belorgey, and R. Buvet, *J. Polym. Sci. Polym. Symp.,* 16, 2931 (1967); "Conductivity and Chemical Properties of Oligomeric Polyaniline", M. Jozefowicz, L-T. Yu, G. Belorgey, and R. Buvet, *J. Polym. Sci. Polym. Symp.,* 16, 2943 (1967); "Products of the Catalytic Oxidation of Aromatic Amines", R. De Surville, M. Jozefowicz, and R. Buvet, *Ann. Chim.* (Paris), 2, 149 (1967); "Conductivity and Chemical Composition of Macromolecular Semiconductors", *Rev. Gen. Electr.,* 75 1014 (1966); "Relation Between the Chemical and Electrochemical Properties of Macromolecular Semiconductors", M. Jozefowicz and L-T. Yu, *Rev. Gen. Electr.,* 75 1008 (1966); "Preparation, Chemical Properties, and Electrical Conductivity of Poly-N-Alkyl Anilines in the Solid State", D. Muller and M. Jozefowicz, *Bull. Soc. Chem., Fr.* 4087 (1972).

U.S. Pat. Nos. 3,963,498 and 4,025,463 describe oligomeric polyanilines and substituted polyanilines having not more than 8 aniline repeat units which are described as being soluble in certain organic solvents and which are described as being useful in the formation of semiconductors compositions having bulk electrical conductivities up to about $7 \times 10^{-3}$ S/cm and, surface resistivities of $4 \times 10^7$ ohm/square. European Patent No. 0017717 is an apparent improvement in the compositions of U.S. Pat. Nos. 3,963,498 and 4,025,463 and states that the polyaniline can be formed into a latex composite through use of acetone solutions of the oligomers of polyaniline and a suitable binder polymer.

U.S. Pat. No. 4,855,361 describes a conductive polymer blend which comprises mixing a polyimide with a base-type polymer containing carbon nitrogen linkages, such as polyaniline, having a polyimide-like group covalently linked to the nitrogen atoms of the base-type polymer. The conductive polymer blend is formed by first reacting a base-type non-conductive polymer containing carbon-nitrogen linkages, such as polyaniline, with a carbonyl anhydride, such as 3,3',4,4'-benzophenone tetracarboxylic dianhydride to form a conductive polymer containing polyimide-like groups conveniently linked to the nitrogen atoms of the base-type polymer mixing such conductive polymer with non-conductive polyamide in a suitable solvent, removing the solvent, and forming a conductive continuous phase blend of the polyimide and the conductive polymer.

U.S. Pat. No. 4,798,685 describes the production of base-type conductive polymers, particularly from the family of conductive polyaniline, by reacting a base-group non-conductive polymer containing carbon-nitrogen linkages, e.g. polyaniline, with an R+ donor compound, where R is an organic group, e.g. methyl iodide, and forming an electrically conductive polymer in which the R groups are covalently linked to the nitrogen atoms of the polymer.

U.S. Pat. No. 4,806,271 describes the production of base-type conductive polymers particularly from the family of conductive polyaniline, by reacting a base-type non-conductive polymer containing carbon-nitrogen linkages e.g., polyaniline, with a cation donor compound, such as $R_2SO_4R$, $R'SO_2Cl$ or $R''_3SiCl$, where R, R' and R'' are alkyl or aryl, such as dimethyl sulfate or tosyl chloride, and forming an electrically conductive polymer in which the R groups of $R_2SO_4$ and $R'SO_2$ groups of $R'SO_2Cl$, or the $R''_3Si$ groups of $R''_3SiCl$ are covalently linked to the nitrogen atoms of the polymer.

U.S. Pat. No. 4,822,638 describes a process for fabricating an electronic device on a non-conductive polymer substrate, particularly from the family of polyaniline, which comprises applying a covalent doping agent, such as an R+ donor compound, where R is an organic group, e.g., methyl iodide, to a preselected portion of a base-type non-conductive polymer substrate containing carbon-nitrogen linkages, and converting such preselected portion of the polymer substrate to an electrically conductive polymer portion, by covalent linkage of the R groups of such donor compound, to the nitrogen atoms of the non-conductive polymer substrate. Electronic devices, such as resistors, capacitors, inductors, printed circuits and the like, can be provided by the invention process, in the form of light-weight polymers containing no metal, and which are stable and wherein the conductive portions are non-diffusing.

U.S. Pat. No. 4,851,487 describes the production of base-type conductive polymers, particularly from the family of conductive polyaniline, by reacting a base-type non-conductive polymer containing carbon-nitrogen linkages, e.g., polyaniline, with an anhydride such as R-SO$_2$-O-SO$_2$-R", R-CO-O-CO-R', R-CO-O-SO$_2$R' or mixtures thereof, where R and R' are alkyl or aryl, e.g., tosylic anhydride or benzophenone tetracarboxylic dianhydride, and forming an electrically conductive polymer in which the SO$_2$R and COR groups are covalently linked to the nitrogen atoms of the conductive polymer and the anion of the conductive polymers is the SO$_3$R' or O$_2$CR' group.

U.S. Pat. No. 4,798,685 describes the production of base-type conductive polymers, particularly from the family of conductive polyaniline, by reacting a base-type non-conductive polymer containing carbon-nitrogen linkages, e.g., polyaniline, with an R+ donor compound, where R is an organic group, e.g., methyl iodide, and forming an electrically conductive polymer in which the R groups are covalently linked to the nitrogen atoms of the polymer.

PCT WO89/01694 describes various of electrically conductive polyaniline doped with certain sulfonated dopants materials such as para-toluene-sulfonic acid. It is disclosed that these materials are thermally stable and can be melt blended with other polymers to form blends.

SUMMARY OF THE INVENTION

This invention relates to particles of a polyaniline doped with two or more dopants where the dopant at or near the surface of said particles is different from the dopant at or near the core of said particles. As used herein, "at or near the surface of the particle" is all or a portion of the surface of said particles to a depth of about 50A or less and "at or near the core of said particle" is all or a portion of the particle more than about 50A from the surface of the particle.

Several advantages flow from this invention. For example, through use of this invention, two or more dopants can be structured in the polyaniline particles to obtain better properties. For example, it is critically important to develop more thermally stable forms of polyaniline which are capable of being melt blended in matrix polymers with higher processing temperatures such as nylons and polycarbonates while at the same time providing a final blended composition having an acceptable level of electrical conductivity. WO 90/10297 published Sep. 7, 1990 and WO 89/101694 published Feb. 23, 1989 identify a broad range of organic acids and their salts as thermally stable dopants for polyaniline. However, some of the most thermally stable dopants such as aryl disulfonates and trisulfonates of benzene and naphthalene exhibit significantly lower conductivity as compared to the less thermally stable dopants such as aryl monosulfonates. Particles in which the polyaniline is doped with dopants structured in a skin/core arrangement (or more generally in a stratified arrangement) can combine the high conductivity of one dopant (preferably in the core) with the high thermal stability of the other dopant (preferably in the skin) to provide a beneficial result.

A variety of other desirable combinations of properties can be achieved through the skin/core or stratified polyaniline particles. For example, such particles can be used to enhance the dispersion ability of polyaniline particles doped in the core with desirable dopant in a matrix of polymers which is incompatible with the core dopant. This embodiment of the invention includes polyaniline particles doped predominantly in the skin or surface region of the particle with a dopant which has a more compatible surface energy with the intended matrix polymer or polymers of the blend but which may provided less electrical conductivity and which is doped predominantly in the core region with a dopant which provides higher levels of electrical conductivity. Other possible desirable features which can be incorporated via a surface dopant/core dopant combination is lessening the hygroscopic tendency of the more electrically conductive core dopant by using for example a fluorinated alkyl sulfonate as the skin dopant and more high conductive toluene sulfonic acid as the core dopant. Still other desirable features which may be incorporated via a surface dopant/core dopant combination is the lessening of the reactivity of the doped polyaniline with contacting metals or with other chemical substances by using a less reactive surface dopant such as a polymeric sulfonate, and using a reactive dopant having a higher level of electrical conductivity predominantly in the core of the particle. This arrangement and combination of dopants provides particles and substrates comprising conductive polyaniline with the combinations of desirable features imparted by both dopants while minimizing or eliminating the undesirable of each if taken individually.

DESCRIPTION OF THE PREFERRED EMBODIMENT

BRIEF DESCRIPTION OF THE DRAWINGS

The invention will be more fully understood and further advantages will become apparent when references is made to the following detailed description of the invention and the accompanying drawings in which.

DESCRIPTION OF THE PREFERRED EMBODIMENTS

Figure 1:
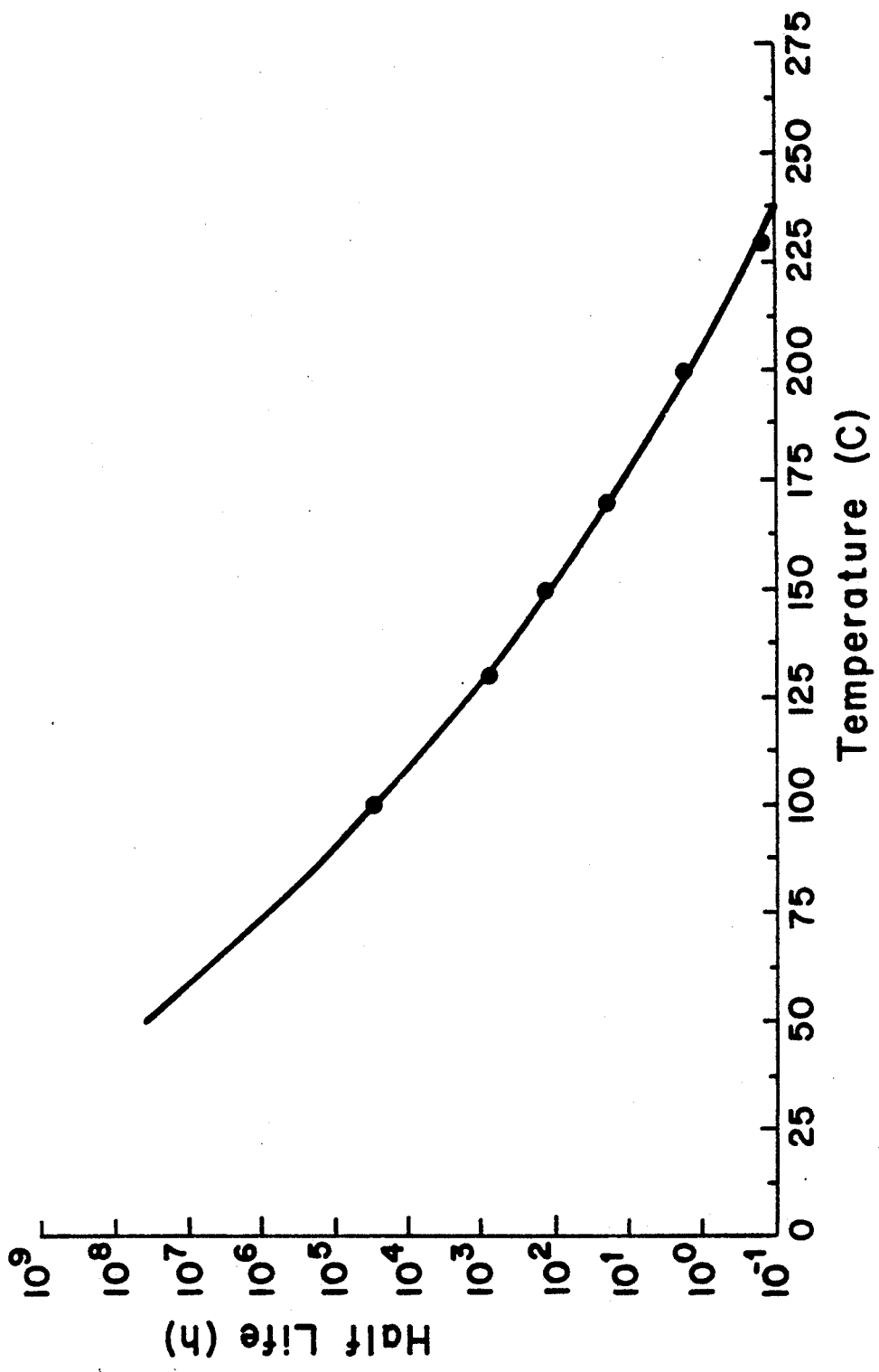
FIG. 1 is a graph of conductivity half life measured for a pellet of compressed polyaniline particles doped with tosylate anions. Measured half life at various temperatures (solid points) is used to project half life over a continuous range of temperature (solid line).

This invention is directed to particles of a polyaniline doped with two or more dopants such that the concentration of at least one dopant at or near the surface of said particles is higher than the concentration of at least one other dopant at or near said core of said particle. Particle size and shape are not critical. For example, the particles can be of an irregular shape or can be of a regular or substantially regular shape. The particles can be regular flat shaped particles having relatively high aspect ratios or can be short block, spherical, oval or like shaped particles having relatively low aspect ratios. In any event, the shape of the particles will be dictated solely by the needs of the specific application. Particle size may also vary widely and is dependent on the particular application. In those applications where relatively large particles are required i.e. 1 to 100 microns, large particles are used; conversely in those applications where relatively small particles are required i.e. less than about one micron, small particles are used. Although not critical, usually particles size is from about 0.05 to about 50 microns. Preferred particles sizes are from about 0.02 to about 3 microns. In some polyaniline compositions particles may exist as aggregates composed of smaller primary particles. It is generally most preferred for the production of uniform blends of high conductivity that these aggregates be broken down to their primary particles during compounding. It is most preferred that the primary particles themselves be doped in a skin/core configuration and that the primary particles range in size from about 0.05 to 0.2 microns.

Polyanilines for use in the process of this invention may vary widely. Any form of substituted and unsubstituted polyaniline can be conveniently used in the practice of this invention. Illustrative of useful forms are those described in Green, A. G. and Woodhead, A. E., CXVII—Aniline-black and Allied Compounds, Part II, *J. Chem. Soc.*, 101 pp. 1117 (1912) and Kobayashi, et al., "Electrochemical Reactions. . . of Polyaniline Film-Coated Electrodes", *J. Electroanal. Chem.*, 177. pp. 281-91 (1984) and in Shacklette, L. W., et al. "Structure and Properties of Polyaniline as Modeled by Single-Crystal Oligomers", *J. Chem. Phys.*, 88, pp. 3955 (1988), which are hereby incorporated by reference. Examples of unsubstituted and substituted polyaniline useful in this invention are characterized by different ratios of phenylene amine and quinone imine backbone segments and include leucoemeraldine, protoemeraldine, emeraldine, nigraniline and pernigraniline.

In the preferred embodiments, polyanilines for use in the invention are polyaniline homopolymers and copolymers of the type derived from the polymerization of one or more unsubstituted and substituted anilines of the Formula I:

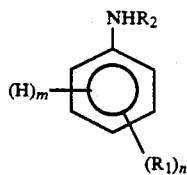

Formula I wherein:
n is an integer from 0 to 5;
m is an integer from 0 to 5, with the proviso that the sum of n and m is equal to 5 and with the further proviso that at least one position on the aniline ring, preferably at the para position, is substituted with a substituent which will allow coupling of the aniline units such halo, hydrozen or other leaving group;
$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate salts, arylsulfinyl, alkoxycarbonyl, arylsulfonyl, carboxylic acid, phosphonic acid, halo, hydroxy, cyano, sulfinic acid, carboxylate salts, borate salts, phosphate salts, sulfonate salts, phosphinate salts, phosphonate salts, phosphonic acid, sulfonic acid, nitro, alkylsilane, or any of the foregoing aryl, aliphatic or cycloaliphatic groups substituted with one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or any two $R_1$ groups together or any $R_2$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more phosphonic acid, sulfonic acid, phosphoric acid, boric acid, carboxylate salt, borate salt, sulfonate salt, phosphinate salts, phosphonate salt, phosphate salt, phosphinic acid, carboxylic acid, halo, nitro, amino, alkylamino, dialkylamino, arylamino, diarylamino, alkylarylamino, cyano or epoxy moieties; or $R_1$ is an aliphatic moiety having repeat units of the formula:

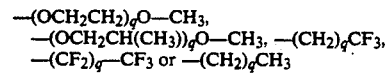

wherein q is a positive whole number; and
$R_2$ is selected from the group consisting of permissible $R_1$ or substituents hydrogen.

Illustrative of the polyanilines useful in the practice of this invention are those of the Formulas II to V:

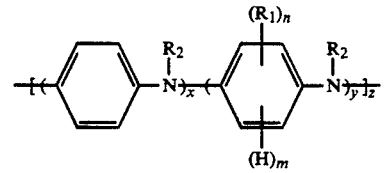

or

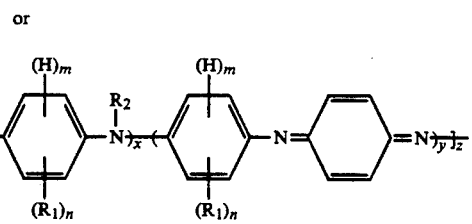

or

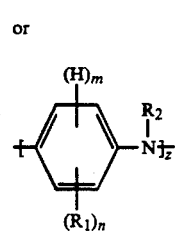

or

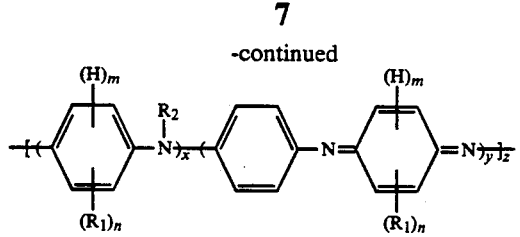

V wherein:
n, m, $R_1$ and $R_2$ are as described above;
x and y are the same or different at each occurrence and are integers equal to or greater than 0, with the proviso that the sum of x and y is greater than 0, preferably x is an integer equal to or greater than about 1 and/or the ratio of x and y is greater than or equal to about 0; and
z is the same or different and is an integer equal to or greater than 1.

The following listing of substituted and unsubstituted anilines are illustrative of those which can be used to prepare polymers and copolymers useful in the practice of this invention.

| | |
|---|---|
| 2-Cyclohexylaniline | 2-Acetylaniline |
| Aniline | 2,5-Dimethylaniline |
| o-Toluidine | 2,3-Dimethylaniline |
| 4-Propanoylaniline | 4-Benzylaniline |
| 2-(Methylamino)aniline | 4-Aminoaniline |
| 2-(Dimethylamino)aniline | 2-Methylthiomethylaniline |
| 2-MethYl-4-methoxy-carbonylaniline | 4-(2,4-Dimethylphenyl) aniline |
| N-Ethylaniline | 2-Ethylthioaniline |
| 4-Carboxyaniline | N-Methyl aniline |
| N-Methyl aniline | N-Propyl-m-toluidine |
| 2,4-Dimethylaniline | N-Methyl-o-cyanoaniline |
| N-Propyl aniline | 2,5-Dibutylaniline |
| N-Hexyl aniline | 2,5-Dimethoxyaniline |
| m-Toluidine | Tetrahydronaphthylamine |
| o-Ethylaniline | o-Cyanoaniline |
| m-Ethylaniline | 2-Methylthioaniline |
| o-Ethoxyaniline | 2,5-Dichloroaniline |
| m-Butylaniline | 3-(n-Butanesulfonic acid) aniline |
| m-Hexylaniline | 3-Propoxymethylaniline |
| m-Octylaniline | 2,4-Dimethoxyaniline |
| 4-Bromoaniline | 4-Mercaptoaniline |
| 2-Bromoaniline | 4-Ethylthioaniline |
| 3-Bromoaniline | 3-Phenoxyaniline |
| 3-Acetamidoaniline | 4-Phenoxyaniline |
| 4-Acetamidoaniline | N-Octyl m-toluidine |
| 5-Chloro-2-methoxy-aniline | 4-Trimethylsilylaniline |
| 5-Chloro-2-ethoxy-aniline | 3-Amino carbazole |
| N-Hexyl-m-Toluidine | N-(p-Amino phenyl) aniline |
| 4-Phenylthioaniline | |
| 3-Amino-9-methylcarbazole | |
| 4-Amino carbazole | |

Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitro benzene sulfonic acid, butylsulfonic acid, phenylsulfonic acid, and the like.

Also illustrative of useful $R_1$ groups are divalent moieties derived from any two $R_1$ groups or a $R_1$ group with a $R_2$ group such as moieties having from about 2 to about 7 repeat units of the formula:

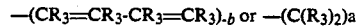

wherein $R_3$ is the same or different at each occurrence and is hydrogen or alkyl, as for example $-(CH_2)_4$, $-(CH_2)_3-$, $-(CH=CH-CH=CH)-$, $-[CH_2-CH(CH_3)-CH_2]-$ and $-(CH_2)_5-$, and groups comprised of such moieties which include one or more heteroatoms of oxygen, nitrogen, ester, sulfonyl, carbonyl, sulfinyl, and/or sulfur, such as $-CH_2SCH_2-CH_2-NHCH_2-$, $-SCH_2NHCH_2-$, $-O-CH_2-CH_2O-O-CH_2-S-CH_2-$, $-CH_2S(O_2)CH_2-$, $-CH_2S(O)CH_2-$, $-OC(O)CH_2CH_2-$, $-CH_2C(O)CH_2-$ and $-CH_2-O-CH_2-$ to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine, benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothio-pyran,aminobenzodiazine, benzethiopyrone amine, amino-coumarin, benzthiopheneamine, benzothiodiazoleamine, and the like.

Exemplary of useful $R_2$ groups are hydrogen and the above-referenced reresentative $R_1$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

Preferred for use in the practice of this invention are polyanilines of the above Formulas II to V in which:
n is an integer from 0 to about 2;
m is an integer from 2 to 4, with the proviso that the sum of n and m is equal to 4;
$R_1$ is aryl, alkyl or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid sulfinate salt, carboxylate salt, sulfonate salt, amino, alkylamino, dialkylamino, arylamino, hydroxy, diarylamino, alkylarylamino, or alkyl, aryl or alkoxy substituted with phosphonic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphonate salt, phosphinate salts, carboxylic acid or sulfonic acid substituents;
$R_2$ is the same or different at each occurrence and is a $R_1$ substituent or hydrogen;
x is an integer equal to or greater than 1;
y is equal to or greater than 0, with the proviso that the ratio of x to y is greater than about 0.5; and
z is an integer equal to or greater than about 5.

Particularly preferred for use in the practice of this invention are polyanilines of the above Formulas in which:
n is an integer from 0 to 1;
m is an integer from 3 to 4, with the proviso that the sum of n and m is equal to 4;
$R_1$ is aryl, alkyl or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylarylamino, or alkyl or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents;
$R_2$ is the same or different at each occurrence and is a $R_1$ substituent or hydrogen;
x is an integer equal to or greater than 2;
y is equal to or greater than 0, with the proviso that the ratio of x to y is greater than about 1; and
z is an integer equal to or greater than about 5.

Amongst the particularly preferred embodiments, most preferred for use in the practice of this invention are polyanilines of the above Formulas III or V in which:
n is an integer from 0 to 1;
m is an integer from 3 to 4, with the proviso that the sum of n and m is equal to 4;
$R_1$ is aryl, alkyl, alkoxy, amino, alkylamino, dialkylamino, arylamino, diarylamino, alkylarylamino, halo, sulfonic acid, sulfonate salt, carboxylic acid or carboxylate salt, or alkyl or aryl substituted with one or more sulfonic acid, carboxylate salt, amino, alkylamino, dialkylamino, arylamino, diarylamino, halo, alkylarylamino, sulfate salt, sulfonate salt, or carboxylic acid substituents, wherein the aromatic moieties include from 6 to about 21 carbon atoms and the aliphatic moieties include from 1 to about 15 carbon atoms;
$R_2$ is hydrogen;
x is an integer equal to or greater than 2;
y is equal to or greater than 1, with the proviso that the ratio of x to y is equal to or greater than about 2; and
z is an integer equal to or greater than about 5.

In the most preferred embodiments of this invention, the polyaniline is derived from unsubstituted aniline, alkoxy, alkyl, or sulfonic acid substituted aniline or copolymers thereof.

In general, the number of aniline repeat units is not critical and may vary widely. The greater the number of aniline repeat units the greater the viscosity and molecular weight of the polyaniline. In those applications where a polyaniline of lower molecular weight and viscosity is required, such material may be used, and in those applications where a polyaniline of high molecular weight and viscosity is required, then such material can be used. The number of aniline repeat units is preferably at least about 10. The upper limit can vary widely depending on the desired viscosity and molecular weight. In the more preferred embodiments of the invention, the number of aniline repeat units is at least about 20, and in the particularly preferred embodiments, the number of repeat units is at least about 30. Amongst the particularly preferred embodiments, most preferred are those embodiments in which the number of repeat units is at least about 40.

Useful polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of 10 S/cm. This conductive form of polyaniline can be treated with ammonium hydroxide in ethanol to form a non-conductive form of polyaniline which is purple in color and which has a conductivity of less than $10^{-8}$ S/cm. Other chemical procedures for preparation of various chemical forms of polyaniline are described in detail in Green et al. described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The polyaniline may be electrically neutral or electrically conductive polyaniline may be used. Polyaniline is rendered electrically conductive by doping with a dopant solute. In general, such dopant solute is derived from a compound, which upon addition to the polyaniline, ionizes the polymer with co-committent formation of a dopant solute species to form a charge transfer complex with polyaniline, which complex has a conductivity equal to or greater than about $10^{-6}\text{ohm}^{-1}\text{Cm}^{-1}$ by the four-in-line probe method.

Dopants for use in the practice of this invention can vary widely and can be such materials which are known in the art for use in doping conjugated backbone polymers to form conductive or semi-conductive polymers, as for example, those described in detail in U.S. Pat. Nos. 4,442,187 and 4,321,114 which are hereby incorporated by reference. Illustrative of useful dopant species are oxidizing dopants. Oxidizing dopants are well known in the conductive polymer art, and any of such known oxidizing dopants can be used.

Illustrative of useful oxidizing dopants are $AsF_5$, $MoOCl_4$, $MoCl_5$, $PCl_5$, $POCl_3$, $PCl_3$, $AlCl_3$, $NO^+$ and $NO_2^+$ salts (such as $NOBF_4$, $NOPF_6$, $NOSbF_6$, $NOAsF_6$, $NOCH_3CO_2$, $NO_2BF_4$, $NO_2PF_6$, $NO_2AsF_6$, $NO_2SbF_6$, and $NO_2CF_3SO_2$), $HClO_4$, $HNO_3$, $H_2SO_4$, benzoylperoxide, $SO_3$, $Br_2$, $(FSO_3)_2$, $ZnCl_2$, $FSO_3H$, and Fe(III) salts (such as $Fe(BF_4)_3$, $FeBr_3$, $Fe(CH_3SO_3)_3$, $Fe(ClO_4)_3$, $FeCl_3$, $Fe(OTs)_3$, and $Fe(CF_3SO_3)_3$ which give rise to doped polymers containing dopant solutes such as $NO_3^-$, $CH_3SO_3^-$, $AlCl_4^-$, $BF_4^-$, $ZnCl_4^-$, $PCl_4^-$, $PF_6^-$, $AsF_6^-$, $SbF_6^-$, $CF_3SO_3^-$, $ClO_4^-$, $OTs^-$, $SO_3^{-2}$, $C_6H_5CO_2^-$, $CH_3SO_3^-$, $FSO_3^-$, and $FeCl_4^-$. Other useful oxidizing dopants include electrolyte salts such as $LiClO_4$, $LiBF_4$, $LiAsF_6$, $NaPF_6$, $Bu_4NClO_4$, $Bu_4NOTs$, $Bu_4NCF_3SO_3$, $LiCF_3SO_3$, $AgOTs$, and the like. Preferred oxidizing dopants for use in the practice of this invention are oxidizing dopants selected from the group consisting of $MoOCl_4$, $MoCl_5$, $PCl_5$, $POCl_3$, and Fe (III) salts such as $Fe(ClO_4)_3$, $FeCl_3$, $FeBr_3$, and $Fe(CF_3SO_3)_3$, and particularly preferred oxidizing dopants for use in the practice of this invention are dopants selected from the group consisting of $MoOCl_4$, $MoCl_5$, $PCl_5$, $POCl_3$, $FeBr_3$ and $FeCl_3$. Amongst these particularly preferred embodiments, most preferred oxidizing dopants are those embodiments in which the oxidizing dopant is $FeCl_3$.

Illustrative of other dopants are inorganic oxidizing or non-oxidizing protonic acid dopants. Such dopants include inorganic acid such as hydrofluoric acid, hydrochloric acid, hydroiodic acid, phosphoric acid, nitric acid, perchloric acid, boric acid, sulfuric acid and the like.

Illustrative of still other useful dopants are non-oxidizing protonic acids such as those of containing anionic moieties of the formula:

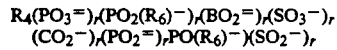

and having one or more cationic moieties selected from the group consisting of:

wherein:
- $R_4$ and $R_6$ are the same or different at each occurrence and are organic radical or amino;
- M is a species having a positive charge equal to s, provided that at least one of $M^{+s}$ is a proton or a moiety which can be transformed by radiation, heat, chemicals and the like into a proton under use conditions such as $^+NH_4$, $^+N(CH_3)_2H_2$, $^+N(C_2H_5)H_3$ and the like;
- s is the same or different at each occurrence and is an integer equal to 1 to 8;
- r is the same or different at each occurrence and is 0 or a positive integer equal to or greater than 1, with the proviso that at least one of r is other than 0.

The $R_4$ and $R_6$ group may vary widely and can be a substituted or unsubstituted aliphatic radical such as alkyl, nitroalkyl, haloalkyl and the like, or a substituted or unsubstituted aromatic radical such as phenyl, halophenyl, nitrophenyl, anthracyl, naphthyl, phenanthryl and the like. $R_4$ and $R_6$ groups may also be a polymeric radical such as a polymer having recurring pendant phenyl groups in the polymeric backbone substituted with sulfonic acid and derivatives thereof such as salts, phosphoric acid and derivatives thereof such as salts, phosphonic acid and derivatives thereof such as salts, sulfinic acid and derivatives thereof such as salts, carboxylic acid and derivatives thereof such as salts, boric acid and derivatives thereof such as salts, or phosphonic acid and derivatives thereof such as salts; moieties such as sulfonated or phosphonated polystyrene, poly(2-methylstyrene), poly(4-phenylstyrene), poly(2-vinyl naphthalene), poly(vinyl benzoate), poly(benzyl methacrylate) and the like. In the particularly preferred embodiments of the invention, $R_4$ and $R_6$ are aromatic radical and in the most preferred embodiments $R_4$ and $R_6$ are substituted or unsubstituted phenyl or naphthyl. The nature of the $M^{+n}$ group may vary widely. For example, $M^{+n}$ may be a non-metal cation such as $Bu_4N^+$, $H^+$, $NO^+$, $NO_2^+$, $NH_4^+$, $N(CH_3)_2H_2$, $^+N(C_2H_5)H_3$, and the like, or may be a metal cation such as $Na^+$, $Li^+$, $Ag^+$, $Ba^{+2}$, $Co^{+3}$, $Al^{+3}$, $Fe^{+3}$ and the like.

Preferred for use in the practice of this invention are organic acid dopants, more preferably those having anionic moieties of the formulas:

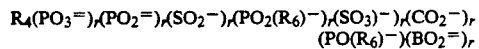

and having a cationic moiety of the Formula:

wherein at least one of the cationic moieties of the formula $M^{+s}$ is a proton or is a moiety which can be transformed into a proton under use conditions;
- $M^{+s}$ is a cationic species having or positing charge s;
- s is an integer equal to or greater than 1, preferably from 1 to about 8;
- $R_4$ and $R_6$ are organic radicals or amino, and
- r is an integer equal to or greater than 1, preferably from 1 to about 8;

More preferred for use in the practice of this invention as dopants are acids or acid derivatives of the formula:

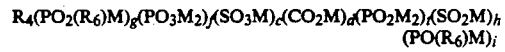

or

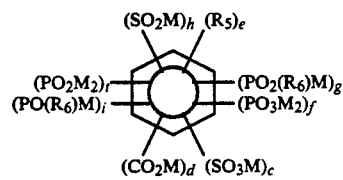

wherein:

M is H+, or other metal or non-metal cation with the proviso that at least one of M is H+or a moiety which can be thermally or chemically transformed into a proton under use conditions, such as +NH₄, +N(CH₃)₂H₂, +N(C₂H₅)H₃ and the like t is 0, 1, 2, 3 or 4;
h is 1, 1, 2, 3 or 4;
i is 1, 1, 2, 3 or 4;
c is 0, 1, 2, 3 or 4;
d is 0, 1, 2, 3 or 4;
f is 0, 1, 2, 3 or 4;
g is 0, 1, 2, 3 or 4, with the proviso that at least one of c, d, f, g, h, i or t is other than 0;
e is 0, 1 or 2; and R₄and R5 are the same or different at each occurrence and are nitro, cyano, hydroxy, halo, amino, alkylamino, dialkylamino, arylamino, diarylamino, alkylarylamino, alkoxy, or salt substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid phosphate salt, boric acid, sulfinate salt, phosphinate salt, sulfinic acid, borate salt, phosphinic acid, phosphonate salt, phosphonic acid, carboxylic acid, nitro, carboxylate salt and the like, or any two R₄ or any two R5 substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or R₄ or R5 is a moiety of the formula:

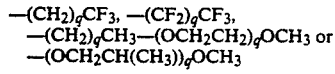

wherein:
q is a positive whole number from 1 to about 10; and
R₆ is alkyl, aryl, aryloxy or alkoxy.

In the particularly preferred embodiment of this invention, useful dopants are acids and/or acid derivatives of the above formula:

R₄(PO₂(R₆)M)g(PO₃M₂)f(SO₃M)c(CO₂M)d(PO₂M₂)f(SO₂M)h(PO(R₆)M)i or

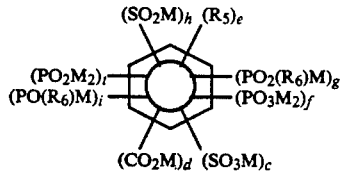

wherein:
c is 0, 1, 2 or 3;
d, t, f, g, h and i are the same or different at each occurrence and are with the proviso that at least one of c, d, t, f or g, i or h is other than 0;
e is 0, 1 or 2;
R₄ and R5 are the same or different are hydroxy, amino, alkylamino, dialkylamino, arylamino, diarylamino, alkyl aryl amino, substituted or unsubstituted phenyl or alkyl wherein permissible substituents are selected from the group consisting of alkyl, hydroxy, amino, alkylamino, dialkylamine, arylamine, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphinate salt, sulfonic acid, carboxylic acid, phosphoric acid, sulfinic acid or sulfinate salts or any two R₆ substituents together may form an unsubstituted or substituted or alkenylene chain completing a naphthalene, anthracene or phenanthracene fused ring system wherein permissible substituents are as described above or R₄or R5 is a moiety of the formula:

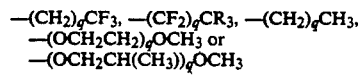

wherein:
q is a positive whole number from 1 to about 10;
R₆ is alkyl, alkoxy, aryloxy or aryl; and
M is H+, or other metal or non-metal cation, with the proviso that at least one of M is H+or a moiety which can be thermally or chemically transformed into a proton under use conditions.

In the most preferred embodiments of this invention, useful dopants are acids and/or acid derivatives of the formula:

R₄(PO₂(R₆)M)g(PO₃M₂)f(SO₃M)c(CO₂M)d or

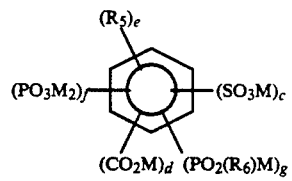

wherein:
c, d, e, f and g are the same or different and are 0, 1 or 2, with the proviso that at least one of c, d, f and g is not 0;

R₄ and R5 are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphonic acid phosphinate salt, phosphonate salt, amino or carboxylic acid groups, or phenyl substituted with one or more alkyl, alkoxy, fluoroalkyl, sulfonic acid, phosphinic acid, phosphonic acid, phosphinate salt, phosphonate salt, sulfonate salt, carboxylate, hydroxy, nitro, cyano, or carboxylic acid groups or any two R₄ or R5 substituents together may form an alkylene or alkenylene chain completing a naphthalene, anthracene or phenanthracene fused system which may be substituted with one or more alkyl, alkoxy, fluoro, phosphinic acid, phosphinate salt, phosphonic acid, phosphonate salt, fluoroalkyl, sulfonic acid, sulfonate salt, carboxylic acid, carboxylate salt, hydroxy, nitro, amino or cyano groups;

$R_6$ is aryl, aryloxy, alkyl or alkoxy; and

M is $H^+$ or other metal or non-metal cation, with the proviso that at least one of M is $H^+$ or is a moiety which can be thermally transformed into a proton under process conditions.

In the especially preferred embodiments of this invention, useful dopants are acids or acid derivatives of the formula:

ti $R_4(SO_3M)_c(CO_2M)_d$ or

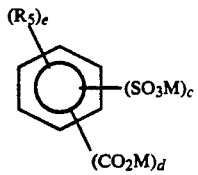

wherein:

c is 1, 2 or 3;

d is 1, 2 or 2 with the proviso that at least one of c, d is not 0 e is 0, 1 or 2;

$R_4$ and $R_5$ are the same or different at each occurrence and are hydroxy, dialkylamino, diarylamino, alkylarylamino, amino, alkylamino, arylamino, alkyl, phenyl, alkyl substituted with one or more fluoro, sulfonic acid, sulfonate salt, alkoxy, dialkylamino, diarylamino, alkylarylamino, carboxylate salt, hydroxy, alkylamino, arylamino, phosphonic acid, nitro, cyano, phosphinic acid, phosphinate salt, phosphonate, amino or carboxylic acid groups, or phenyl substituted with one or more alkyl, alkoxy, fluoroalkyl, dialkylamino, diarylamino, alkylarylamino, sulfonic acid, alkylamino, arylamino, sulfonate salt, carboxylate salt, hydroxy, phosphinate acid, phosphinate salt, nitro, cyano, amino or carboxylic groups or any two $R_4$ and $R_5$ substituents together may form an alkylene or alkenylene chain completing a naphthalene, anthracene or phenanthracene fused system which may be substituted with one or more alkyl, alkoxy, fluoro, fluoroalkyl, sulfonic acid, sulfonate salt, carboxylic acid, phosphinic acid, phosphinate salts, carboxylate salt, hydroxy, nitro, amino, alkylamino, dialkylamino, arylamino, diarylamino, alkylarylamino, or cyano groups;

M is $H^+$ or other metal or non-metal cation or a moiety which can be thermally transformed into a proton under process conditions.

- In the process of the embodiment of this invention of choice, the dopant is a sulfonic acid or sulfonic acid derivative of the formula:

wherein;

c is 1, 2 or 3;

e is 0, 1 or 2;

$R_5$ is alkyl or alkyl substituted with one or more fluoro groups, or any two $R_2$ groups together may form an alkenylene chain completing a naphthalene fused ring system which may be substituted with one or more sulfonic acid, sulfonic salt group or a combination thereof; and M is a proton, or other metal or non-metal cation, with the proviso that at least one of M is proton.

The following is a listing of dopants which are useful in the practice of the most preferred embodiments of this invention for formation of the dopant solute.

1-anthracene sulfonic acid,
9-anthracene sulfonic acid,
2-phenanthracene sulfonic acid,
3-phenanthracene sulfonic acid,
9-phenanthracene sulfonic acid,
$NO_2CF_3SO_3$,
$CF_3SO_3H$,
perflouro octyl sulfonic acid
perfluoro octyl carboxylic acid
octylsulfonic acid,
dodecylsulfonic acid,
cetylsulfonic acid,
toluenesulfonic acid (TsOH),
$Fe(OTs)_3$,
$Fe(CH_3SO_3)_3$,
$(FSO_3)_2$,
AgOTs,
$Me_3SiOTs$,
dodecylbenzene sulfonic acid,
naphthalene sulfonic acid,
benzene disulfonic acid,
benzene sulfonic acid,
1,3-benzene disulfonic acid,
2,5-dihydroxy-1,4-benzene disulfonic acid,
camphor sulfinic acid
naphthalene trisulfonic acid
dodecylbenzene sulfonic acid,
ethane sulfonic acid
1,5-naphthalene disulfonic acid,
nickel phthalocyanine tetrasulfonic acid,
phenyl phosphonic acid,
diphenyl phosphinic acid
phenyl phosphinic acid,
3-sulfopropyl acrylate,
3-sulfopropyl methacrylate,
sulfamic acid,
5-sulfosalicyclic acid,
trion (4,5-dihydroxy-1,3-benzene disulfonic acid),
vinyl sulfonic acid,
sulfanilic acid,
4-sulfophthalic acid,
sulfoacetic acid,
methyl phosphinic acid,
phenylphosphonic acid,
methyl phosphonic acid,
methyl orange,
sulfonated polystyrene,
sulfonated poly(2-vinyl naphthalene),
naphthol yellow,
naphthol blue black,
1,2-naphthoquinone-4-sulfonic acid,
naphthylazoxine S,
1-octane sulfonic acid,
t-butyl phosphonic acid,
ethyl phosphonic acid,
butyl phosphonic acid,
1,2-benzene disulfonic acid,
4-octylbenzene sulfonic acid, 2-mesitylene sulfonic acid,
2,6-naphthalene disulfonic acid,
2-naphthalene sulfonic acid,
1,3,6-naphthalene trisulfonic acid,
1,3,7-naphthalene trisulfonic acid,
sulfonazo III acid,
biphenyl disulfonic acid,
biphenyl sulfonic acid,
1,8-dihydroxynaphthalene-3-6-disulfonic acid,
3,6-dihydroxynaphthalene-2,7-disulfonic acid,
4,5-dihydroxynaphthalene-2,7-disulfonic acid,
6,7-dihydroxy-2-naphthalene sulfonic acid,
1-naphthalene phosphoric acid,
1-naphthalene sulfonic acid,
1-naphthalene-5,7-dinitro-8-hydroxy,
1-naphthalene-4-hydroxy sulfonic acid,
4-bromo benzene sulfonic acid,
4-hydroxy-5-isopropyl-2-methyl benzene sulfonic acid
3,4-diamino benzene sulfonic acid
benzenephosphoric acid,
1,3,5-benzene trisulfonic acid,
2-methyl-5-isopropyl benzene sulfonic acid,
3,4-dinitro benzene sulfonic acid,
2-methoxy benzene sulfonic acid,
1-naphthalene-5-hydroxy sulfonic acid,
1-naphthalene-7-hydroxy sulfonic acid,
1-naphthalene-3-hydroxy sulfonic acid,
1-napthalene-1-hydroxy sulfonic acid,
4-phenylamino benzene sulfonic acid,
1,6-naphthalene disulfonic acid,
1,5-naphthalene disulfonic acid,
1,3-naphthalene-7-hydroxy disulfonic acid, and
$Me_3SiOSO_2CF_3$.

Dopants which are preferred for use at or near the core of the conductive polyaniline particles of this invention when the purpose is to achieve high conductivity include but or not limited to:
methane sulfonic acid,
trifluoromethane sulfonic acid,
p-toluene sulfonic acid,
4-hydroxybenzene sulfonic acid,
benzene sulfonic acid,
perchloric acid,
sulfuric acid, and
trifluoroacetic acid.

Dopants which are preferred for use in this invention at or near the outer surface layer of the polyaniline particles of this invention when the purpose is to achieve increased compatibility between the conductive polymer particles and a matrix polymer of lower surface energy and lesser polar character include those which contain one or more alkyl or fluoroalkyl substituents of length equal to or greater than about 2 carbon atoms, preferably equal to or greater than about 5 carbon atoms, more preferably equal to or greater than about 8 carbon atoms, and most preferably equal to or greater than 12 carbon atoms. Such dopants include but are not limited to:
octylsulfonic acid,
perfluorooctylsulfonic acid,
dodecylsulfonic acid,
dodecylbenzenesulfonic acid,
dinonylnaphthalenesulfonic acid and
dodecyldiphenyl ether disulfonic acid.

The latter is available from Dow Chemical Co. as DOWFAX 2A0. TM. Such dopants are also capable of lessening the hygroscopic nature of the polymer Particles.

Dopants which are preferred for use at or near the outer surface layer or surface layers of the particles of this invention when the purpose is to obtain more thermally stable compositions are organic sulfonic acids containing more than one sulfonic acid group including disulfonates such as
1,5-naphthalene sulfonic acid,
2,6-naphthalene sulfonic acid,
dodecyldiphenyl ether disulfonic acid
1-naphthol-3,6-disulfonic acid,
diphenylether-4,4'-disulfonic acid,
diphenylsulfone-4,4'-disulfonic acid, and
2,5-dihydroxy-1,4-benzene disulfonic acid.

Also preferred as thermally stable dopants for use at or near the outer surface of the particles of this invention are organic sulfonates including oligomer and polymeric sulfonates containing more than two sulfonic acid groups such as
1,3,6-naphthalene trisulfonic acid,
polyvinyl sulfonic acid,
sulfonated polystyrene,
sulfonated poly(4-vinyl naphthalene), and the like.

The amount of dopant added to the polyaniline at ar the surface of the particle or at or near the core of the particle is not critical and may vary widely. In general, sufficient dopant is added to the polyaniline such that the conductivity of at least about $10^{-9}$ $ohm^{-1}cm^{-1}$. The upper level of conductivity is not critical and will usually depend on the type of aniline polymer employed and the dopant. In general, the highest level of conductivity that can be obtained is provided without unduly adversely affecting the environmental stability of the polyaniline. In the preferred embodiments of the invention, the amount of dopant employed is sufficient to provide a conductivity of at least about $10^{-6}ohm^{-1}cm^{-1}$ and in the particularly preferred embodiments is sufficient to provide a conductivity of from about $10^{-4}ohm^{-1}cm^{-1}$ to about $10^{+3}ohm^{-1}cm^{-1}$. Amongst these particularly preferred embodiments, most preferred are those embodiments in which sufficient dopant is employed to provide a conductivity of at least about $10^{-3}ohm^{-1}cm^{-1}$ to about $10^{+3}ohm^{-1}cm^{-1}$, with amounts sufficient to provide a conductivity from about $10^0 ohm^{-1}cm^{-1}$ to about $10^{+3}ohm^{-1}cm^{-1}$ usually being the amounts of choice.

The region or portion of the particles doped by a particular dopant and the selected dopant are critical. In general, the area at or near the surface of the particle is predominantly doped with a dopant that is "compatible" with the environment or matrix in which the Particles will be dispersed and/or the conditions under which said particles will be dispersed. As used herein "compatibility" refers to the extent to which the dopant and the environment or matrix are misicible and include meeting one or more of the following criteria: closely matching the cohesive energies of the particle and the matrix; obtaining low, chemical reactivity between the particle and the matrix or other medium with which the particle will come in contact; and maximizing dispersive polar or hydrogen bonding interactions which will lead to the facile dispersion of the particles in the matrix. Additionally, when two or more dopants are employed it is generally preferred that the dopant at or near the surface be the most thermally stable of the dopants. The region of the particle at or near the core of the particle is doped with any kind of dopant, but is preferably doped with a dopant or mixture of dopants, which offers high conductivity and/or high thermal stability. The dopant within the core can be "incompatible" with the environment in which the particle is used or is adversely affected by such environment (reduction in beneficial properties) to any extent As used herein, "incompatible" is the opposite to compatible and refers to having a mismatched surface energy or a chemical reactivity toward the matrix or the environment in which the particle is embedded. When more than two dopants are to be employed in a multilayer structure it is Preferred that the dopant in the outer most layer be the most compatible with the matrix, the dopant in the next outermost layer produce the most thermally stable doped polymer, and the dopant in the innermost layer offer high conductivity or other advantages in the use or synthesis of the conductive polymer particles of this invention.

This degree of structure provides for an increase in the effectiveness of the particles under use conditions. For example, highly dispersible high conductivity particles with high thermal stability are sought for dispersion in higher temperature thermoplastics, such as poly(ethylene terephthalate), poly(ethylene terephthalate glycol), nylon 6, nylon 66, polycarbonate, poly(phenylene oxide), and the like. When such blends are used, for example, to provide electromagnetric interference (EMI) shielding, a blend conductivity greater than about 0.1 S/cm is usually required and a blend conductivity of greater than 1.0 S/cm is preferred. Uniform distribution of particles is sought to prevent gaps in the shield. Surfaces and corners in molded articles typically present difficulties for achieving sufficiently uniform distribution of particles. The present invention provides means for achieving the desired properties of the blend by providing conductive particles which by virtue of their multilayer structure Preferably combine the requirements for compatibility, thermal stability, and high conductivity.

Similarly, the present invention provides a means of providing dispersible particles of a desirable size, geometry, and surface area. Such particles are generally produced by a nucleation and growth process within the reaction mixture. The size, shape, and surface area of such particles is known by those of skill in the art to be a function of reaction conditions especially including the chemical composition of the dopant which is typically present during the synthesis of the polyaniline. The present invention allows for the optimal choice of dopant for this purpose since the other required characteristics, compatibility with the matrix and thermal stability, can be added or enhanced in a post synthesis via a controlled exchange of dopant(s) in the surface regions of the particles. While we do not wish to be bound by any theories, we postulate that the loss of conductivity from regions containing thermally unstable doped polyaniline compositions frequently occurs via outward diffusion and/or evaporation of the dopant. The use of a thermally stable dopant in an outer layer of the particle prevents or slows the loss of dopant from within the particle by limiting the outward diffusion of such dopants of lower thermal stability. The particles may include various other optional ingredients. For example, salts containing dopant anions, plasticizers, or dispersion aids.

The particles of this invention can be manufactured using modification of conventional chemical or electrochemical doping procedures such as those of U.S Pat. No. 4,820,595 relating to polyaniline which is hereby incorporated by reference. For example, particles of polyaniline can be prepared by addition of an oxidant to solutions of the aniline monomer. The dopant anion incorporated in the polyaniline may be derived from the oxidant (e.g. $FeCl_4^-$ from $FeCl_3$) or it may be derived from an acid or salt which is also present in the solution (e.g., $CH_3(C_6H_4)SO_3^-$ when tosylic acid is present) during addition of an oxidant such as ammonium persulfate. Such conventional procedures produce doped conductive Polyaniline particles and particle aggregates which are in general homogeneously doped with a dopant or mixture of dopants. In the present invention, such dopants or mixtures of dopants form the core of the conductive polyanilines particles. The outer layer or layers of the particles of this invention which contain dopant produced either during synthesis or after synthesis by dopant exchange or by partial dopant removal and replacement. It is possible to achieve a stratified dopant configuration by using an excess of a different salt or acid during the latter stages of the polymerization reaction. More preferred is to filter and wash the particles after the synthesis to remove any free salt or acid of the first core dopant type or depending on the degree of washing to remove a surface layer of the core dopant from each particle. A dopant layer of different composition can be then achieved by washing or slurrying the polymer particles in a solution of the new dopant. Repeatedly washing with different dopants will produce multiple layers. It is preferred that primary particles rather than aggregates receive a core/shell dopant structure. It is preferred that the aqueous or nonaqueous solvent or solvent mixture employed in the procedure act to swell the polyaniline particles. It is also preferred that the entire Procedure act to swell the polymer particles. It is also preferred that the entire procedure from synthesis through to the formation of a layered dopant structure be carried out while keeping the polyaniline particles wetted by a liquid which swells the polyaniline.

The electrically conductive polyaniline composition of this invention can be used for any purpose for which conductive polymers are useful. For example, the composition can be used to form electrically conductive articles for shielding purposes, anti-static purposes or adhesive. Examples of articles include conductive polymer housings for EMI Shielding of sensitive electronic equipment such as microprocessors, infrared, radio frequency and microwave absorbing shields, flexible electrically conducting connectors, conductive bearings, brushes and semiconducting photoconductor junctions, electrodes, capacitors, optically transparent or non-transparent corrosion-preventing coatings for corrodible materials such as steel, antistatic materials and optically transparent or non-transparent coatings for packaging electronic components, antistatic carpet fibers, waxes for floors in computer rooms, antistatic finishes for CRT screens, aircraft, auto windows, electostatic dissipative packaging for electronics, and the like.

The particles of this invention are particularly suited for use in the manufacture of emulsions, suspensions of the polyaniline, blends of the polyaniline with other polymers as for example, other conjugated backbone polymers, thermoplastic polymers such as polyamides, polycarbonates, polyesters, polylactones, polyolefins, polyacrylics; thermosetting resins such as phenolics and phenolic derivatives, alkyds, unsaturated polyester, epoxies, melamines, amino resins and allylics; and mixtures thereof. For example, blends of conductive polyaniline particles which are inherently highly polar may be made with a polymer such as poly(ethylene terephthalate glycol) (PETG) or polycarbonate (PC) by combining a core dopant such as tosylate ($CH_3(C_6H_4)SO_3^-$), which offers high conductivity with a surface dopant such as dodecylbenzene sulfonate which offers increased compatibility with PETG or PC via the long-chain alkyl substituent on the dopant anion.

The following specific examples are presented to more particularly illustrate the invention, and should not be construed as being limitations on the scope and spirit of the invention.

EXAMPLE I

Polyaniline (PAni) (320 G) doped with para-toluene sulfonic acid (PTSA) (PAni-OTs (approx. 8% S) was filtered on a Buchner funnel and was placed into a bucket, and 3 liters of 1M PTSA having a concentration of 1 mol/L were added and stirred for ½ hour. The material was again filtered on the Buchner funnel. Then the filtrate was combined with 3 liters of boiling water and the mixture was stirred with an agitator/mixer for 10 minutes, then filtered on the Buchner funnel. The filter cake had a sulfur content of about 5% by weight. A solution of methanol (2.5 L) containing 2 weight % of para-dodecylbenzene sulfonic acid (DBSA) were added to the filter cake and stirred for ½ h. The mixture was then filtered again. The filtered material was dried in a fluid bed dryer at a maximum temperature of 80° C.

The skin/core particles, (PAni-tosylate (OTs)-dodecylbenzene sulfonate (DBS)), and polyaniline tosylate (PAni-OTs) particles were combined with matrix polymers, polycaprolactone (PCL) and (PETG), into composites.

The relative proportions of the polyaniline components were varied over a range of samples from about 50% by weight polyaniline to about 5% by weight. Conductivity of compression molded samples of each blend were measured by a four-probe technique. A plot of the logarithim of conductivity as a function of volume percent polyaniline gave an approximately "S" shaped curve in each case. Such characteristic "percolation" curves were analyzed to determine a "percolation point" (the point of steepest rise in conductivity) specified by the volume percent loading of polyaniline at that point, and the saturation conductivity as evidenced by the conductivity observed for the highest loading level for polyaniline in the blend.

The results are set forth in the following Table II. In the Table, the conductivity of polyaniline is given in the first row and is that taken on a compressed Pellet consisting of 100% polyaniline containing the specified dopant anion(s). The saturation conductivity given in the bottom row refers to the blend with PETG.

TABLE II

| Property | Doped PAni Particles | |
|---|---|---|
| | (PAni-OTs) | (PAni-OTs/DBS) |
| A. Conductivity of PAni | 7.55 S/cm | 4.5 S/cm |
| B. Percolation Point in PCL | 8% | 8% |
| C. Percolation Point in PETG | 20-25% | 9.5% |
| D. Saturation Conductivity in PETG | $5 \times 10^{-4}$ S/cm | 2.5 S/cm |

EXAMPLE 2

Polyaniline tosylate (PAni-OTs) was prepared from aniline, p-toluene sulfonic acid (PTSA), and ammonium persulfate solution by first combining the aniline and the acid, and then slowly adding the ammonium persulfate solution to the acid and aniline solution in approximately one hour. The solids which were formed were then filtered and washed successively twice with water (75° C.), once with 5% solution of PTSA (slurry for 1 to 2 hrs), and finally with a 2% solution of PTSA in methanol. After filtration, the solids were dried in a vacuum oven at 130° C. until the temperature of the powdered solids reached 110° C. The water content of the solids was determined to be less than 3% by weight.

EXAMPLE 3

Polyanilinium tosylate coated by dodecylbenzene sulfonate (PAni OTs/DBS) was prepared as in Example 2 with the exception that dodecylbenzene sulfonic acid (DBSA) was substituted for the PTSA in the final methanol wash. By elemental analysis the resulting dried powder was found to contain approximately (by molar ratio) 70% OTs and 30% DBS. Since exposure of PAni OTs to a concentrated solution of DBSA will cause the replacement of PTSA with DBSA via a process which requires the outward diffusion of PTSA and the inward diffusion of DBSA, the above process produced a polyaniline which was preferentially doped on the surface of each powder grain and/or primary particle with DBSA.

EXAMPLE 4

Polyaniline tosylate coated by naphthalene disulfonate was prepared by the procedure of Example 3 wherein naphthalene disulfonic acid (NDSA) was substituted for PTSA only in the final methanol wash and this wash was maintained at 75° C.

EXAMPLE 5

Polyaniline tosylate heavily exchanged with dodecylbenzene sulfonate (PAni-OTs/DBS (heavy) and polyaniline tosylate heavily exchanged with naphthalene disulfonate (PAni-OTs/NDS (heavy)) where prepared in the manner of Example 2, with the exception that DBSA and NDSA were substituted for PTSA in the final two washes, the first was being made at 75° C.

EXAMPLE 6

The relative thermal stabilities of the various forms of Polyaniline, described in Examples 2-5 above, were determined by the following procedure: The powdered polyaniline was compressed into pellets with a diameter of 0.7 cm and a thickness of about 0.09 cm. The pellets were placed in an apparatus in which the given pellet was contacted by gold pins at four equally spaced points (90 degrees apart) near the circumference of the pellet. In this configuration a four-probe resistance measurement could be made which could be used to calculate the bulk conductivity of the pellet from the equation $\sigma = 0.215/(Rd)$, where $\sigma$ is conductivity in S/cm (or $ohm^{-1}cm^{-1}$), R is resistance in ohms, and d is pellet thickness in cm. The pellet was maintained in an atmosphere of flowing nitrogen and was held at various constant temperatures (130° C., 150° C., 170° C., 200° C., and 230° C.) while the conductivity was observed to decay. In order to insure that all samples were thoroughly dry, the pellets were first held at 150° C. for 16 hours before conductivity data were taken. All of the samples exhibited a decay in conductivity as an exponential function of time at a given temperature which could be described by the relation, $$\sigma(t)=\sigma^\circ e^{-(t/\tau)^\alpha}$$

where $\sigma(t)$ is the conductivity at a time, t: $\sigma_0$ is the initial conductivity at time t=0; $\tau$ is an experimentally determined characteristic decay time; and $\alpha$ is an experimentally determined parameter for a given sample at each temperature. The value of $\alpha$ typically lay in a range from 0.77 to 1.0. With the help of this equation a charateristic half-life of the conductivity can be determined at each temperature from the value of $\tau$ and $\alpha$ determined at that temperature according to the relation, $$t_{\frac{1}{2}}=(\ln 2)^{1/\alpha}$$

where ln is the naperian logarithm and $t_{\frac{1}{2}}$ is the time required for the conductivity to decrease by half (half life). Since the determination of $\tau$ and $\alpha$ can be made from the functional form of the decay at early times, this method does not require that the conductivity be driven down to one half its original value at each temperature. As a result, this method allows the determination of the half lives at the five temperatures listed above on the same sample without unduly altering the thermal decay characteristics of the sample by heavily degrading the sample at each temperature. The following Table II summarizes the results obtained for the various polyaniline samples.

In the Table II, the abbreviations have the following meanings:

(a) "PAni-OTS" is polyaniline doped with tosylate as in Example 2.
(b) "PAni-OTS/DBS" is skin/core polyaniline particles doped with tosylate at the core and doped with dodecylbenzene sulfonate at the skin as in Example 3.
(c) "PAni-OTs/DBS (heavy)" is polyaniline heavily doped with dodecylbenzene sulfonate as in Example 5.
(d) "PAni-OTS/NDS" is skin/core polyaniline particles doped with tosylate at the core and doped with naphthalene disulfonate at the skin as in Example 4.
(e) "PAni-OTs/NDS (heavy)" is polyaniline heavily doped with naphthalene disulfonic acid as in Example 5.

TABLE II

Conductivity Half Lives of Polyaniline Compositions

| Composition | $\sigma_o$ (S/cm) | $t_{\frac{1}{2}}(170^\circ C.)$ (h) | $t_{\frac{1}{2}}(200^\circ C.)$ (h) | $t_{\frac{1}{2}}(230^\circ C.)$ (h) |
|---|---|---|---|---|
| PAni-OTs | 5.4 | 20.6 | 1.8 | 0.15 |
| PAni-OTs/DBS | 6.2 | 20.0 | 1.5 | 0.21 |
| PAni-OTs/DBS (heavy) | 0.9 | 10.1 | 1.3 | 0.23 |
| PAni-OTs/NDS | 6.4 | 54.3 | 4.1 | 0.34 |
| PAni-OTs/NDS (heavy) | 1.0 | 98.6 | 15.8 | 1.4 |

The conductivity given in the Table II, $\sigma$, is that obtained at 150° C. after drying 16 hours at 150° C. The conductivity half lives, $t_{\frac{1}{2}}$ are those measured at 170° C., 200° C., and 230° C. The data are arranged in order of thermal stability at the highest temperature 230° C. The data for the samples having a skin/core arrangement of different organic sulfonate dopant anions illustrate a synergy of desirable properties which goes beyond a simple average. The core and skin combination of PTSA and DBSA, respectively, (PAni OTs/DBS) results in a conductive polyaniline which combines the higher thermal stability of PAni/DBS with the high conductivity of PAni/OTs. Likewise, the PAni OTs/NDS sample combines the high conductivity of PAni/OTs with a significant improvement in the thermal stability stemming from its skin of the dopant, NDSA, even though this sample received only a light treatment with NDSA in the final wash. The sample PAni OTs/NDS (heavy) shows an even more substantial increase in thermal stability. For comparison with the results of Table II, a sample of polyaniline doped with hydrochloric acid was also tested. This sample was treated at temperatures below 100° C. because it was to resistive to measure at temperatures above 100° C. The initial conductivity offer drying at 90° C. was 2.9 S/cm.

EXAMPLE 7

Figure 2:
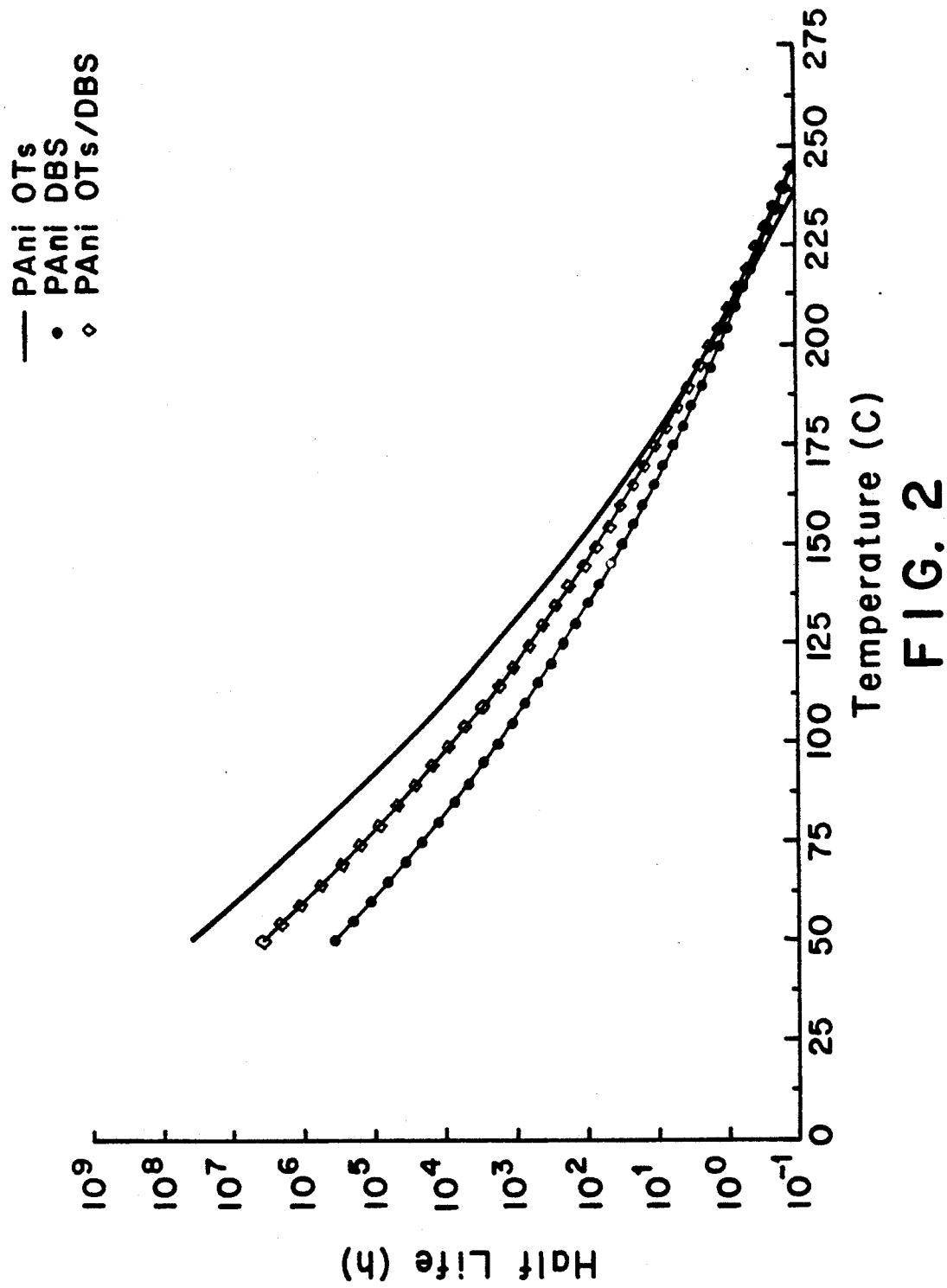
FIG. 2 is a graph of conductivity half life versus temperature for a pellet of compressed polyaniline particles doped with tosylate, and a combination of tosylate and dodecylbenzene sulfonate in a skin/core configuration, where in the latter case the tosylate dopant predominates at the core and the dodecylbenzene sulfonate dopant predominates at the skin.
Figure 3:
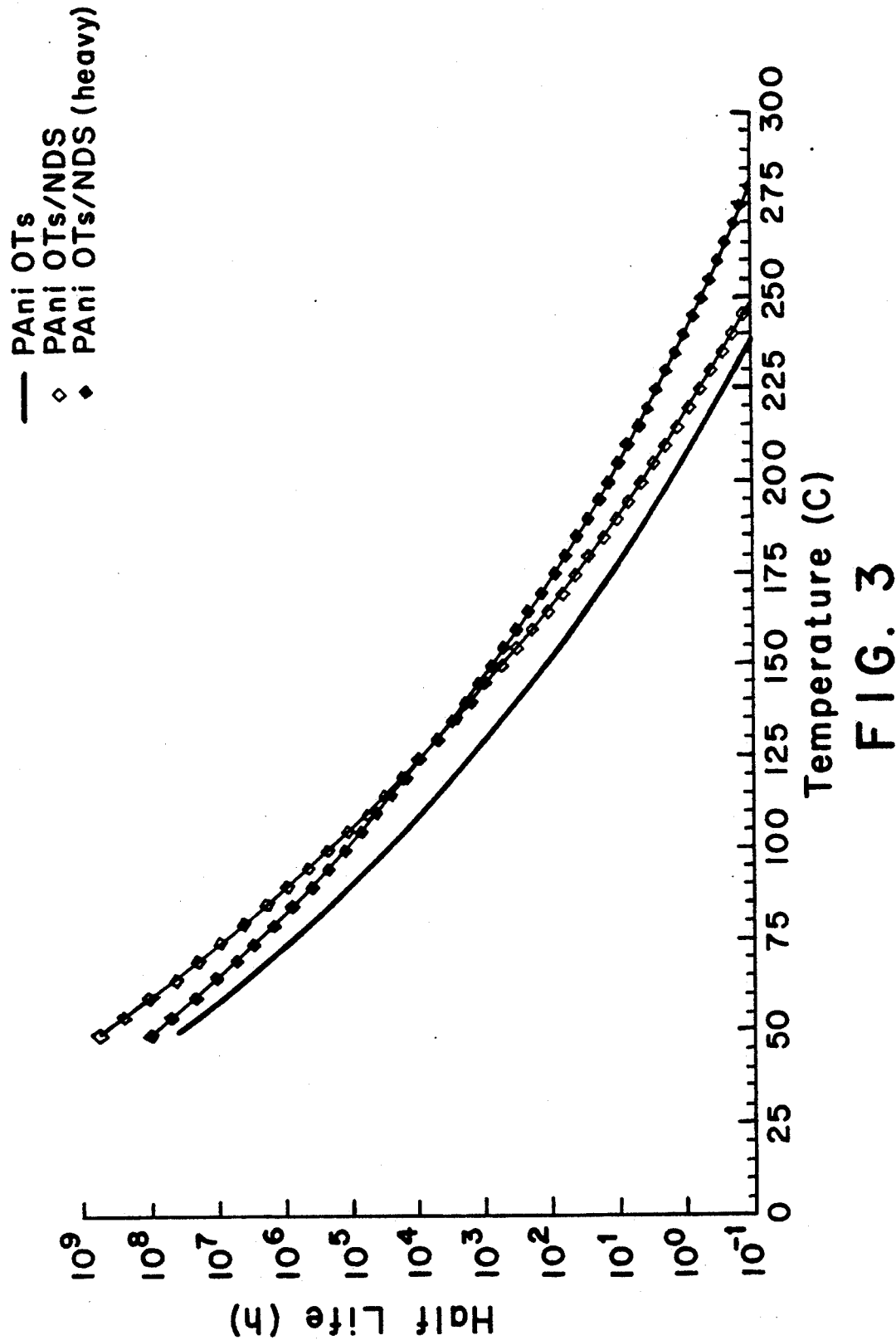
FIG. 3 is a graph of half-life versus temperature for polyaniline particles doped with tosylate, and a combination of tosylate and 1,5-naphthalene disulfonate in a skin/core configuration, where in the latter case the tosylate dopant predominates at the core and the naphthalene disulfonate dopant predominates at the skin.

The data for the half lives taken as in Example 6 at 130° C., 150° C., 170° C., 200° C., 230° C. was shown to follow an Arrhenius exponential as a function of temperature of the form, $$t_{\frac{1}{2}}=t(_{\frac{1}{2}})\cdot e^{E_a/KT}$$

where e is the base of the naperian logarithm and K is the Boltzmann constant. The activation energy, $E_a$, was determined from the slope of a plot of $\ln[t_{\frac{1}{2}}]$ vs the inverse of absolute temperature in degrees Kelvin. The naperian logarithm of the prefactor, $\ln[(t_{\frac{1}{2}})0]$, was determined from the intercept at $1/T=0$. These empirically determined parameters were then used to predict the thermal stability (i.e., the conductivity half life) over a range of temperature extending from 50° C. to about 280° C. The agreement between the predicted variation of half-life and data taken for PAni-OTs is shown in FIG. 1 projected results are given in FIG. 2 for PAni OTs, PAni-OTs/DBS and PAni-OTs/DBS (heavy). FIG. 3 compares the projected results obtained for PAni-OTs, PAni-OTs/NDS and PAni-OTs/NDS (heavy). These figures illustrate that the thermal stability for the samples with a skin/core dopant arrangement is enhanced beyond a simple averaging of properties. These data were used to estimate an upper limit for processing temperature ($T_p$) and for continuous use temperature ($T_u$). Temperatures corresponding to maximum processing times of 0.1 h and 1.0 h were calculated along with the temperatures where the continuous use time was 5 years. Table III below summarizes the results obtained for the various compositions which were tested.

TABLE III

Use Temperature and Processing Temperatures of Polyaniline Compositions

| Composition | $T_u$ (C.) | $T_p$ (1 h) (C.) | $T_p$ (0.1 h) (C.) |
|---|---|---|---|
| PAni-OTs | 97 | 206 | 239 |
| PAni-OTs/DBS | 84 | 207 | 245 |
| PAni-OTs/DBS (heavy) | 68 | 203 | 246 |
| PAni-OTs/NDS | 112 | 217 | 249 |
| PAni-OTs/NDS (heavy) | 112 | 239 | 280 |

Table III indicates that the addition of DBSA or NDSA as a surface dopant on PAni-OTs raises the processing temperature in each case. As shown in Table IV, the use temperature of PAni-OTs/DBS is found to be intermediate between that of PAni-OTs and PAni-OTs/DBS (heavy), and there is a small increase in the higher processing temperature for both (DBSA treated) samples in comparison with PAni-OTs. The use temperatures of PAni-OTs/NDS and PAni-OTs/NDS (heavy) are found to be nearly equivalent, yet the processing temperatures for the sample with a heavy skin of NDS anions are much higher than these for the sample with lightly doped skin layer.

What is claimed is:

1. An electrically conductive polyaniline particle comprising a substituted or unsubstituted polyaniline doped with two or more dopants, at least one of said dopants predominating at or near the surface of said particles and at least one other dopant predominating at or near the core of said particle said polyaniline selected from the group consisting of homopolymer or copolymer of the type derived from polymerizing an aniline of the formula:

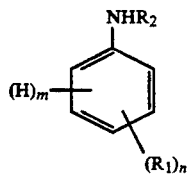

wherein:
n is an integer from 0 to 5;
m is an integer from 0 to 5, with the proviso that the sum of n and m is 5;
$R_1$ is phosphinic acid, phosphonic acid, sulfonic acid, boric acid, phosphoric acid, amino, sulfonate salt, borate salt, hydroxy, phosphonate salt, phosphinate salt, phosphate salt, sulfinic acid, nitro, sulfinate salt, carboxylic acid, halo, carboxylate salt, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylamino, alkylarylamino, aryloxy, hydroxy, alkylthioalkyl, alkylaryl, arylalkyl, alkylsulfinyl, alkoxyalkyl, alkylsulfonyl, aryl, arylthio, arylsulfinyl, alkoxycarbonly, alkylsilane, or arylsulfonyl, wherein permissible substituents are one or more amino, phosphinate salt, alkylamino, dialkylamino, arylamino, diarylamino, phosphoric acid, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties; or any two $R_3$ substituents or any one $R_3$ substituent and $R_2$ substituent taken together may form substituted or unsubstituted alkylene, alkynylene or alkenylene chain completing a 3, 4, 5, 6, 7, 8, 9 or 10 membered aromatic, or alicyclic carbon ring, or a substituted or unsubstituted heteroalicyclic or heteroaromatic ring which includes one or more divalent ester, carbonyl, nitrogen, sulfur, sulfinyl, sulfonyl or oxygen group wherein permissible substituents are one or more amino, alkylamino, phosphinic acid, phosphinate salt, dialkylamino, arylamino, diarylamino, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties, or $R_1$ is an aliphatic moiety of the formula:
it $(OCH_2CH_2)_qO—CH_3$, $(OCH_2CH(CH_3))_qO—CH_3$, $(CH_2)_qCF_3$, $(CF_2)_qCF_3$ or $(CH_2)_qCH_3$ wherein q is a positive whole number; and
$R_2$ is the same or different at each occurrence and is $R_1$ substituents or hydrogen.

2. The particle according to claim 1 wherein said homopolymer or copolymer is of the formulas II to V:

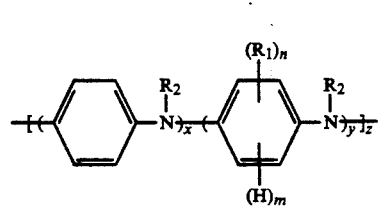

or

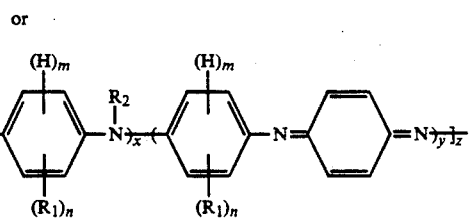

or

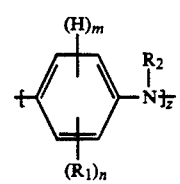

or

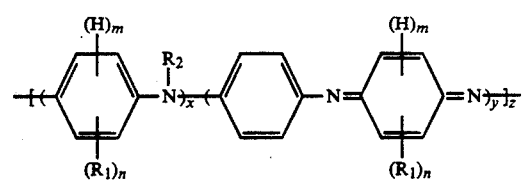

wherein:
x and y are the same or different at each occurrence and are integers equal to or greater than 0, with the proviso that the sum or x and y are greater than 0;
z is an integer equal to or greater than bout 1;
n is an integer from 0 to 3;
m is an integer from 1 to 4, with the proviso that the sum of n and m is 4;
$R_1$ is the same or different at each occurrence and is alkyl, alkenyl, alkoxy, cycloalkyl, cycloalkenyl, alkanoyl, amino, alkylamino, dialkylamino, arylamino, diarylamino, alkylarylamino, alkylthio, aryloxy, alkylthioalkyl, alkylaryl, arylalkyl, alkylsulfinyl, alkoxyalkyl, alkylsulfonyl, aryl arylthio, arlsulfinyl, alkoxycarbonyl, phosphinic acid, phosphonic acid, alkylsily, boric acid, arylsulfonyl, carboxylic acid, halo, hydroxy, phosphate salt, sulfonate salt, phosphonate salt, borate salt, phosphinate salt, carboxylate salt, nitro, cyano, sulfonic acid, phosphoric acid or aryl, alkyl or alkoxy substituted with one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salt, phosphinic acid, phosphinate salt, carboxylate salt, phosphonic acid or borate salt substituents; or any two $R_1$ groups or any one $R_1$ group and $R_2$ group together may form a substituted or unsubstituted alkylene or alkenylene chain completing a 3, 5, 6, 7, 8, 9 or 10 member aromatic or alicyclic carbon ring, or a heteroaromatic or heteroalicyclic ring which includes one or more divalent nitrogen, ester, carbonyl, sulfur, sulfinyl, sulfonyl or oxygen group wherein permissible substituents are one or more sulfonic acid, carboxylic acid, sulfinate salt, phosphoric acid, boric acid, sulfinic acid, halogen, nitro, cyano, epoxy, hydroxy, sulfate salt, phosphate salt, phosphonate salts, phosphinic acid, phosphinate salt, carboxylate salts, phosphonic acid or borate salt substituents; and $R_2$ is the same of different at each occurrence and is $R_1$ substituents or hydrogen.

3. The particle according to claim 2 wherein m is from about 2 to about 4.

4. The particle according to claim 3 wherein m is from about 3 to about 4.

5. The particle according to claim 1 wherein said polyaniline is derived from substituted anilines.

6. The particle according to claim 1 wherein said polyaniline is derived from unsubstituted aniline.

7. The particle according to claim 5 wherein $R_1$ is the same or different at each occurrence and is alkyl or alkoxy having from 1 to about 30 carbon atoms.

8. The particle according to claim 7 wherein $R_1$ is the same or different at each occurrence and is alkyl having from 1 to about 20 carbon atoms or alkoxy having from 1 to about 20 carbons.

9. The particle according to claim 4 wherein $R_1$ is alkyl or substituted alkyl.

10. The particle according to claim 5 wherein said homopolymer or copolymer is of the Formulas II to V wherein:

n is an integer from 0 to about 2;
m is an integer from 2 to 4, with the proviso that the sum of n and m is equal to 4;
$R_1$ is aryl, alkyl or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid, sulfinate salt, carboxylate salt, sulfonate salt, amino, alkylamino, dialkylamino, arylamino, hydroxy, diarylamino, alkylarylamino, or alkyl, aryl or alkoxy substituted with phosphonic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphate salt, phosphinate salt, carboxylic acid or sulfonic acid substituents;
$R_2$ is the same or different at each occurrence and is a $R_1$ substituent or hydrogen;
x is an integer equal to or greater than 1;
y is equal to or greater than 0, with the proviso that the ratio of x to y is greater than about 0; and
z is an integer equal to or greater than about 5.

11. The particle according to claim 10 wherein:
n is an integer from 0 to 1;
m is an integer from 3 to 4, with the proviso that the sum of n and m is equal to 4;
$R_1$ is aryl, alkyl or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylarylamino, or alkyl or aryl substituted with carboxylic acid, phosphoric acid, boris acid, phosphate salt, phosphonic acid, borate salt, sulfonate salt, amino, alkylamino, dialkylamino, arylamino, diarylamino, alkylarylamino, carboxylate salt, halo, phosphate salt, or sulfinic acid substituents;
$R_2$ is the same or different at each occurrence and is a $R_1$ substituent or hydrogen;
x is an integer equal to or greater than 2;
y is equal to or greater than 0, with the proviso that the ratio of x to y is greater than about 0.5; and
z is an integer equal to or greater than about 5.

12. The particle according to claim 11 wherein:
n is an integer from 0 to 1;
m is an integer from 3 to 4, with the proviso that the sum of n and m is equal to 4;
$R_1$ is aryl, alkyl, alkoxy, amino, alkylamino, dialkylamino, arylamino, diarylamino, alkylarylamino, halo, sulfonic acid, sulfonate salt, carboxylic acid or carboxylate salt, or alkyl or aryl substituted with one or more sulfonic acid, carboxylate salt, amino, alkylamino, dialkylamino, arylamino, diarylamino, halo, alkylarylamino, sulfate salt, sulfonate salt, or carboxylic acid substituents wherein aromatic moieties include from 6 to about 21 carbon atoms and the aliphatic moieties are from 1 to about 15 carbon atoms;
$R_2$ is hydrogen;
x is an integer equal to or greater than 2;
y is equal to or greater than 1, with the proviso that the ratio of x to y is equal to or greater than about 1; and
z is an integer equal to or greater than about 5.

13. The particle according to claim 12 wherein:
n is 0 or 1;
m is 3 or 4, with the proviso that the sum of n and m is 4;
$R_1$ is sulfonic acid or a salt thereof, alkoxy, or alkyl; and
$R_2$ is hydrogen, arylsulfonyl or alkylsulfonyl.

14. The particle according to claim 13 wherein:
n is 1;
m is 3;
$R_1$ is sulfonic acid or salt thereof,
$R_2$ is hydrogen.

15. The particle according to claim 13 wherein:
n is 0;
m is 4; and
$R_2$ is hydrogen.

16. The particle according to claim 1 wherein said polyaniline is doped with one or more organic acid dopants or salts thereof having anionic moieties of the formula:

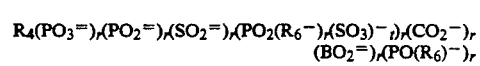

and having a cationic moiety of the Formula:

$$M^{+s}$$

wherein at least one of the cation moieties of the formula $M^{+s}$ is a proton or is a moiety which can be transformed into a proton under use conditions;

$M^{+s}$ is a cationic species having a positive charge s;

s is an integer equal to or greater than 1;

$R_4$ and $R_6$ are organic radicals or amino, and ri is an integer equal to or greater than 1.

17. The particle according to claim 16 wherein said dopants are acids or acid derivatives of the formula:

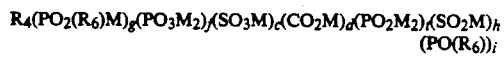

or

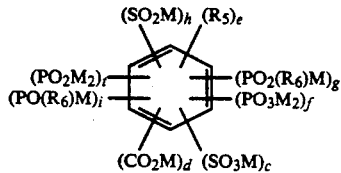

wherein:

M is $H^+$, or other metal or non-metal cation with the proviso that at least one of M is $H^+$ or a moiety which can be thermally or chemically transformed into a proton under use conditions;

t is 0, 1, 2, 3 or 4;

o is 0, 1, 2, 3 or 4;

h is 0, 1, 2, 3 or 4;

c is 0, 1, 2, 3 or 4;

d is 0, 1, 2, 3 or 4;

f is 0, 1, 2, 3 or 4;

g is 0, 1, 2, 3 or 4, with the proviso that at least one of t, i, h, c, d, f or g is other than 0;

e is 0, 1, or 2; and $R_4$, $R_5$ and $R_6$ are the same or different at each occurrence and are nitro, cyano, hydroxy, halo, amino, alkylamino, dialkylamino, arylamino, diarylamino, alkylarylamino, alkoxy, or salt substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid phosphate salt, boric acid, sulfinate salt, phosphinate salt, sulfinic acid, borate salt, phosphinic acid, phosphonate salt, phosphonic acid, carboxylic acid, nitro or carboxylate salt, or any two $R_4$ or and two $R_5$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfinic acid or carboxylic acid groups, or $R_4$ or $R_5$ is an aliphatic moiety of the formula;

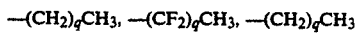

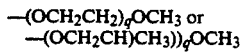

wherein:

q is a positive whole number from 1 to about 10.

18. The particle according to claim 17 wherein said dopants, acid derivatives or a combination thereof of the formula:

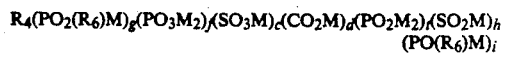

or

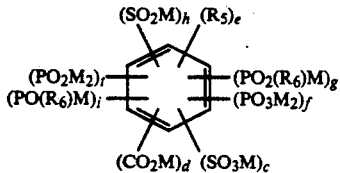

wherein:

c, d, t, i, f, g and h are the same or different at each occurrence and are 0, 1, 2 or 3 with the proviso that at least one of c, h, i, t, d, f or g is other than 0;

e is 0, 1 or 2;

$R_4$ and $R_5$ are the same or different are hydroxy, amino, alkylamino, dialkylamino, arylamino, diarylamino, alkylarylamino, substituted or unsubstituted phenyl or alkyl wherein permissible substituents are selected from the group consisting of alkyl, hydroxy, amino, alkylamino, dialkylamino, arylamino, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphonic acid, phosphinate salt, sulfonic acid, carboxylic acid, phosphoric acid, sulfinic acid or sulfinate salts or any two $R_6$ substituents together may form an unsubstituted or substituted alkenylene chain completing a naphthalene, anthracene or pheanathracene fused ring system wherein permissible substitutes are as described above or $R_4$ or $R_5$ is a aliphatic moiety of the formula:

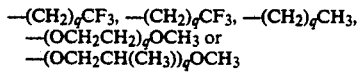

wherein:

q is a positive whole number from 1 to about 10;

$R_6$ is alkyl, alkoxy, aryloxy or aryl; and

M is $H^+$, or other metal or non-metal cation, with the proviso that at least one of M is $H^+$ or a moiety which can be thermally or chemically transformed into a proton under use contains.

19. The particle according to claim 18 wherein said dopants are of the formula:

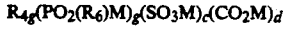

or

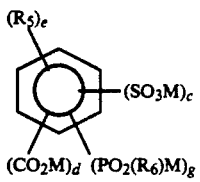

wherein:

c, d, e, and g are the same or different and are 0, 1 or 2 with the proviso that at least one of c, d, and g is not 0;

$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphinate salt, amino or carboxylic acid groups, or phenyl substituted with one or more alkyl, alkoxy, fluoroalkyl, sulfonic acid, phosphinic acid, phosphinic salt, sulfonate salt, carboxylate, hydroxy, nitro, cyano, or carboxylic acid groups or any two $R_4$ or $R_5$ substituents together may form an alkylene or alkenylene chain completing a naphthalene, anthracene or phenanthracene fused system which may be substituted with one or more alkyl, alkoxy, fluoro, phosphinic acid, phosphinate salt, fluoralkyl, sulfonic acid, sulfonate salt, carboxylic acid, carboxylate salt, hydroxy, nitro, amino or cyano groups;

$R_6$ is aryl, aryloxy, alkyl or alkoxy; and

M is $H^+$ or other metal or non-metal cation, with the proviso that at least one of M is $H^{30}$ or is a moiety which can be thermally transmuted into a proton under process conditions.

20. The particle according to claim 18 wherein said dopants are of the formula:

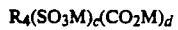
$R_4(SO_3M)_c(CO_2M)_d$ or

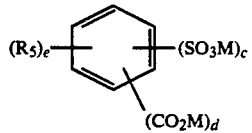

wherein:

c is 1, 2 or 3;

d is 0, 1 and 2, with the proviso that at least one of c, or d is not 0;

e is 0, 1 or 2;

$R_4$ and $R_5$ are the same or different at each occurrence and are hydroxy, dialkylamino, diarylamino, alkylarylamino, amino, alkylamino, arylamino, alkyl, phenyl, alkyl substituted with one or more fluoro, sulfonic acid, sulfonate salt, alkoxy, dialkylamino, diarylamino, alkylarylamino, carboxylate salt, hydroxy, alkylamino, arylamino, phosphonic acid, nitro, cyano, phosphinic acid, phosphinate salt, phosphonate amino or carboxylic acid groups, or phenyl substituted with one or more alkyl, alkoxy, fluoralkyl, dialkylamino, diarylamino, alkylarylamino, sulfonic acid, alkylamino, arylamino, sulfonate salt, carboxylate salt, hydroxy, phosphinate acid, phosphinate salt, nitro, cyano, amino or carboxylic groups or any two $R_4$ $R_5$ substituents together may form an alkenylene or alkenylene chain completing a naphthalene, anthracene or phenanthracene fused system which may be substituted with one or more alkyl, alkoxy, fluoro, fluoralkyl, sulfonic acid, sulfonate salt, carboxylic acid, phosphinic acid, phosphinate salts, carboxylate salt, hydroxy, nitro, amino, alkylamino, dialkylamino, arylamino, diarylamino, alkylarylamino, or cyano groups; and M is $H^+$ or other metal or non-metal cation or a moiety which is thermally transformed into a proton under process conditions.

21. The particle according to claim 20 wherein said dopant is a sulfonic acid, sulfonic acid derivative or a combination thereof to the formula:

or

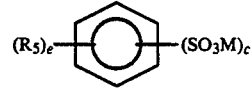

wherein c is 1, 2 or 3;

e is 0, 1 or 2;

$R_5$ is alkyl or alkyl substituted with one or more fluoro, or any two $R_2$ groups together may form an alkenylene chain competent a naphthalene faced system which may be substituted with one or more sulfonic acid or, sulfonic acid salt, fluoro or alkyl group; and M is a proton, or other metal or non-metal cation, with the proviso that at least one of M is proton.

22. The particle according to claim 21 wherein said polyaniline is unsubstituted polyaniline and at least one of said dopants predominating at the core of said a particle is selected from group consisting of methane sulfonic acid, trifluoromethane sulfonic acid, p-toluene sulfonic acid, 4-hydroxybenzene sulfonic acid, benzene sulfonic acid, perchloric acid, sulfonic acid, and trifluoracetic acid.

23. The particle according to claim 22 wherein at least one of said dopants predominating at the core of said particle is p-toluene sulfonic acid.

24. The particle according to claim 22 where at least one dopant predominating at or near the outer surface of said particle is a compatibility enhancing dopant selected from the group consisting of aliphatic acid or aliphatic acid having three or more carbon atoms or aromatic acids substituted with one or more substituted alkyl groups having three or more carbon atoms or one or more alkyl groups unsubstituted with on or more fluoro substituents, a thermally stable dopant which forms doped unsubstituted polyaniline which is thermally stable at a temperature of 200° C. selected from the group consisting of aromatic material having more than one sulfonic acid group, oligomeric and polymeric materials containing more than two sulfonic acid groups or a combination thereof.

25. The particle according to claim 24 wherein the number of carbon atoms is equal to or greater than about 5.

26. The particle according to claim 25 wherein the number of carbon atoms is equal to or greater than about 8.

27. The particle according to claim 26 wherein the number of carbon atoms is equal to or greater than about 12.

28. The particle according to claim 25 wherein said compatibility engaging dopant is selected from the group consisting of octylsulfonic acid, perfluorooctylsulfonic acid, dodecylsulfonic acid, dodecylbenzenesulfonic acid, dinonylnaphthalenesulfonic acid and dodecyldiphenyl ether disulfonic acid.

29. The particle according to claim 24 wherein said thermally stable dopant is selected from the group consisting of 1,5-naphthalene sulfonic acid, 2,6-naphthalene sulfonic acid, 1-naphthol-3,6-disulfonic acid, diphenylether-4,4'-disulfonic acid, diphenylsulfone-4,4'-disulfonic acid, 1,3,6-naphthalene trisulfonic acid, and 2,5-dihydroxy-1,4-benzene disulfonic acid.

30. The particle according to claim 24 wherein said oligomers and polymeric sulfonates are selected from the group consisting of polyvinyl sulfonic acid, sulfonated polystyrene, sulfonated poly(vinyl naphthalene) and sulfonated phenolic resin.

31. An electrically conductive polyaniline particle of unsubstituted polyaniline wherein said particle is piped predominantly at or near the core with toluenesulfonic acid and is doped predominately at or near the surface with dodecylbenzene sulfonic acid.

32. An electrically conductive polyaniline particle of unsubstituted polyaniline wherein said particle is doped predominantly at or near the core with toluene sulfonic acid and is doped predominantly at or near the surface with naphthalene disulfonic acid.

* * * * *